United States Patent
Naeyaert et al.

(10) Patent No.: US 10,064,340 B2
(45) Date of Patent: Sep. 4, 2018

(54) PROCESSING CONVEYANCE FOR AN AGRICULTURAL BALER WITH NON-CROP MATERIAL RELEASING SIEVE

(71) Applicant: CNH Industrial America LLC, New Holland, PA (US)

(72) Inventors: Karel Naeyaert, Loppem (BE); Patrick Staelens, Gistel (BE); Hans De Gersem, Assebroek (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/904,021

(22) PCT Filed: Jul. 8, 2014

(86) PCT No.: PCT/EP2014/064645
§ 371 (c)(1),
(2) Date: Jan. 8, 2016

(87) PCT Pub. No.: WO2015/004153
PCT Pub. Date: Jan. 15, 2015

(65) Prior Publication Data
US 2016/0157435 A1    Jun. 9, 2016

(30) Foreign Application Priority Data

Jul. 10, 2013 (BE) .................... 2013/0481

(51) Int. Cl.
*A01F 15/10* (2006.01)
*A01D 75/18* (2006.01)

(52) U.S. Cl.
CPC ............ *A01F 15/10* (2013.01); *A01D 75/187* (2013.01); *A01F 15/101* (2013.01)

(58) Field of Classification Search
CPC combination set(s) only.
See application file for complete search history.

(56) References Cited

U.S. PATENT DOCUMENTS

| 763,905 A | 6/1904 | Kauffman |
| 2,674,839 A * | 4/1954 | Russell ................ A01F 15/101 100/189 |
| 3,621,901 A * | 11/1971 | Dodgen ................ A23N 17/00 241/101.762 |
| 3,911,519 A * | 10/1975 | Anlas ...................... E01H 1/047 100/189 |
| 4,136,507 A * | 1/1979 | Hobbs .................... A01D 29/00 460/128 |
| 4,569,282 A * | 2/1986 | Galant .................... A01F 15/04 100/189 |

(Continued)

FOREIGN PATENT DOCUMENTS

DE        681999 C   10/1939

*Primary Examiner* — Alicia Torres
(74) *Attorney, Agent, or Firm* — Patrick M. Sheldrake

(57) ABSTRACT

An agricultural baler includes a processing conveyance that is positioned between a pickup roll and a main bale chamber for conveying crop material from the pickup roll to the main bale chamber. The processing conveyance includes at least one of a bottom wall and side wall having at least one sieve with a plurality of openings extending through the sieve. The openings are sized and configured for allowing non-crop material to exit from the at least one processing conveyance through the openings.

22 Claims, 14 Drawing Sheets

(56) References Cited

U.S. PATENT DOCUMENTS

| | | | |
|---|---|---|---|
| 5,456,075 A * | 10/1995 | Meijer | A01F 15/10 100/189 |
| 7,252,587 B2 | 8/2007 | Viaud | |
| 8,393,137 B1 | 3/2013 | Crosby | |
| 2011/0290921 A1 | 12/2011 | Gaudreault et al. | |
| 2013/0203474 A1 * | 8/2013 | Kelderman | A01F 15/10 460/117 |

* cited by examiner

PROCESSING CONVEYANCE FOR AN AGRICULTURAL BALER WITH NON-CROP MATERIAL RELEASING SIEVE

This application is the US National Stage filing of International Application Serial No. PCT/EP2014/064645 filed on Jul. 8, 2014 which claims priority to Belgian Application BE2013/0481 filed Jul. 10, 2013, each of which is incorporated herein by reference in its entirety.

FIELD OF THE INVENTION

The present invention relates to agricultural balers, and, more particularly, to the sub-assemblies on such balers used to pick up and convey the crop material into the main bale chamber.

DESCRIPTION OF THE RELATED ART

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber which is then transferred to a main bale chamber (for purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor feeder or rotor cutter unit which chops the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

With a large square baler as described above, the pickup roll picks up crop material and may also pick up non-crop material such as dust, dirt, stones, sticks, etc. The non-crop material may be conveyed through the packer unit and pre-compression chamber to the main bale chamber, where it becomes part of the formed bale. Such non-crop material has the potential to damage and/or wear the internal workings of the baler, and also is not desirable in the formed bale. For example, sand or stones in the formed bales may be detrimental to livestock which eat the formed bales. Moreover, sand in the formed bales may be converted to glass when the bales are burned as fuel.

U.S. Pat. No. 8,393,137 discloses a biomass harvesting system for harvesting agricultural material. A collecting apron receives a windrow of biomass from a windrower. The windrower has an auger in a slotted housing allowing dirt and particulate materials to be sifted out of the biomass being transported there along. Collecting apron delivers on its turn the harvested biomass to a pre-chopper where the biomass is reduced to smaller pieces to facilitate a uniform density of the final bale of biomass, upon which it is delivered to a pre-compression chamber where the predefined quantity of biomass is formed into an individual flake and inserted into a compression chamber to form a bale.

What is needed in the art is an agricultural baler which eliminates at least some of the non-crop material which is picked up by the pickup roll, prior to bale formation in the main bale chamber.

SUMMARY OF THE INVENTION

The present invention provides an agricultural baler having a processing conveyance (such as a pre-compression chamber and/or packer unit and/or pick up unit) with a sieve in a bottom wall to allow non-crop material to pass through the sieve to the outside environment.

The invention in one form is directed to an agricultural baler including a processing conveyance that is positioned between a pickup roll and a main bale chamber for conveying crop material from the pickup roll to the main bale chamber. The processing conveyance includes a bottom wall having at least one sieve with a plurality of openings extending through the sieve. The openings are sized and configured for allowing non-crop material to exit from the at least one processing conveyance through the openings.

An advantage of the present invention is that non-crop material such as dust, dirt and stones is eliminated from the finished bales.

Another advantage is that sand is eliminated from the finished bales, which might otherwise be converted to glass if the bales are burned for fuel.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
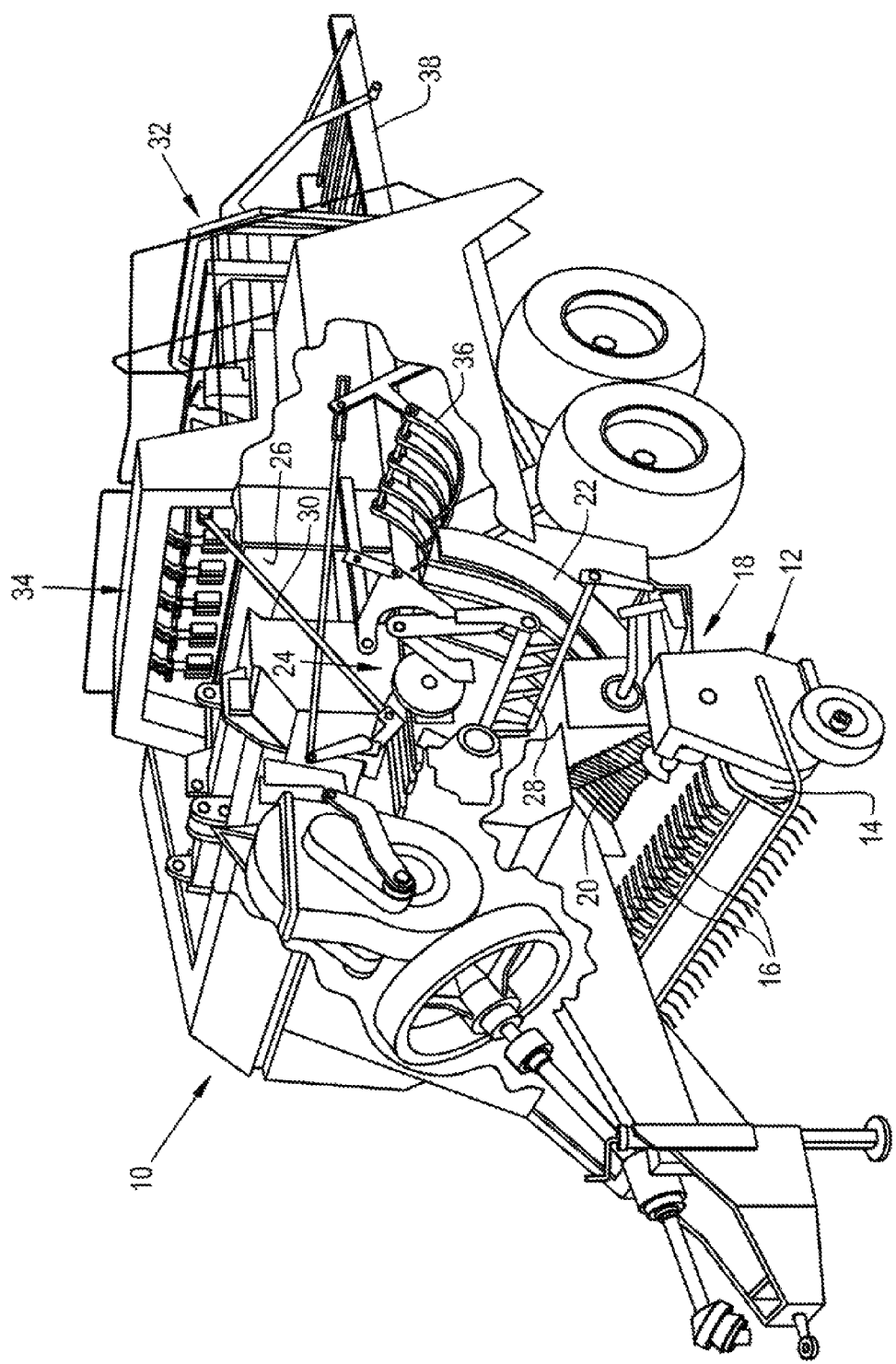
FIG. 1 is a perspective cutaway view showing the internal workings of a large square baler.

Referring now to the drawings, and more particularly to FIG. 1, there is shown an agricultural harvesting machine in the form of a large square baler 10. Baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. The pre-compression chamber 22 and packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. Stuffer forks 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. Main bale chamber 26 and plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

Figure 2:
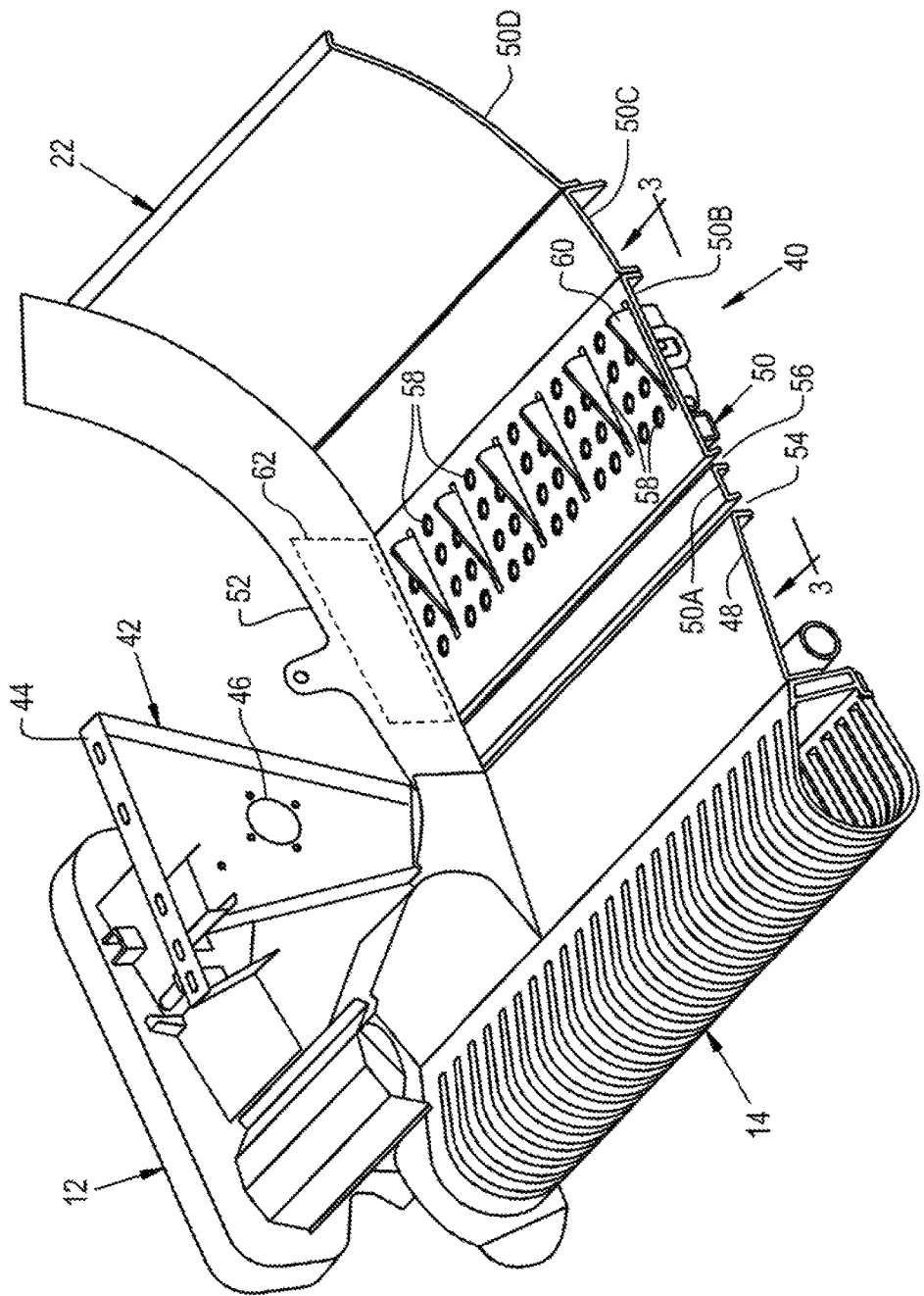
FIG. 2 is a perspective cutaway view showing a portion of a pickup unit and pre-compression chamber in a baler, showing an embodiment of a sieve of the present invention.
Figure 3:
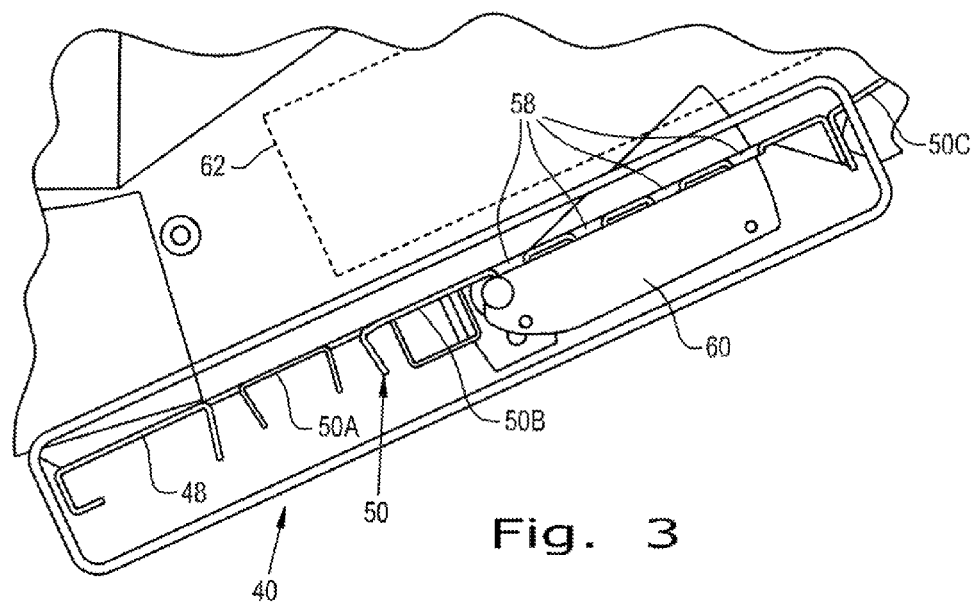
FIG. 3 is a side sectional view taken along line 3-3 in FIG. 2.

Referring now to FIGS. 2 and 3, there is shown a portion of a pickup unit 12 and pre-compression chamber 22 in a baler 10, illustrating an embodiment of a sieve 40 of the present invention. Pickup unit 12 includes a pickup roll 14 (only the outer housing of which is visible), similar to pickup roll 14 shown in FIG. 1. Pickup unit 12 also includes a packer unit 42 (only a portion of which is shown) with an end wall 44 having a bearing mounting location 46 for the packer tines. Positioned at the bottom of the packer unit 42 is a bottom wall 48 defining a pick-up plate for crop material and non-crop material which is picked up and moved rearwardly by pickup roll 14.

A pre-compression chamber 22 is positioned rearwardly from the pickup unit 12. The pre-compression chamber 22 includes a bottom wall 50 and pair of side walls 52 (one of which is shown). The packer unit 42 at the rear of the pickup unit and the pre-compression chamber 22 together define a processing conveyance which conveys the crop material from the pickup roll 14 to the main bale chamber 26 (not shown in FIGS. 2 and 3).

According to an aspect of the present invention, the packer unit 42 and/or the pre-compression chamber 22 have a bottom wall 48, 50 with at least one sieve 40 having some type of openings (e.g., slots, holes and/or ramped apertures) that allow non-crop material to pass through to the outside environment, avoiding potential damage to the mechanical components and reducing or eliminating contamination of the finished bale. In the embodiment shown in FIGS. 2 and 3, pre-compression chamber 22 has a sieve 40 defined by a multi-part bottom wall 50 including bottom wall sections 50A, 50B, 50C and 50D. At the leading and trailing edges of bottom wall section 50A are transverse slots 54 and 56 which allows some of the non-crop material to pass therethrough to the ambient environment.

Bottom wall section 50B includes a plurality of holes 58 which are arranged in a plurality of rows of holes. Holes 58 also allow non-crop material to pass therethrough to the ambient environment. Vertically oriented plates 60 extend through slots (not numbered) formed in bottom wall section 50B and are used to trigger stuffer unit 24 when the crop material is at a predetermined compression value within pre-compression chamber 22.

Bottom wall sections 50C and 50D are each solid wall sections which abut each other without a space therebetween. The leading edge of bottom wall section 50C also abuts the trailing edge of bottom wall section 50B without a space therebetween. Any non-crop material which is conveyed past bottom wall section 50B thus is conveyed to the main bale chamber 26. However, it is obvious that the sections 50A, 50C and 50D can also be equipped with holes or slots in the plates to evacuate non-crop material. Likewise, it is also possible to provide for a space between the different bottom wall sections to create a maximum of opportunity to evacuate the non-crop material.

Preferably the bottom wall 48 of packer unit 18 includes one or more sieves as described above to eliminate non-crop material from the finished bale, alone or in combination with one or more sieves in one or more bottom wall sections 50A-D of the bottom wall 50. However, as shown in FIGS. 2 and 3, it is also possible to provide one or more optional sieves 62 (shown in phantom lines) in one or both sidewalls 52 of pre-compression chamber 22 for the purpose of further eliminating non-crop material.

During harvesting of the crop material, crop material and possibly some non-crop material may both be picked up by pickup roll 14 and transferred rearwardly toward packer unit 42. Since the bottom wall 48 of packer unit 42 is solid in the embodiment shown in FIGS. 2 and 3, the crop and non-crop material continues rearwardly toward pre-compression chamber 22. Some of the non-crop material may pass through transverse slots 54 and 56 adjacent to bottom wall section 50A, while more of the non-crop material may pass through holes 58 in bottom wall section 50B. The crop material is compressed in pre-compression chamber 22 until vertical plates 60 are depressed and actuate stuffer unit 24. The crop material is then moved from the pre-compression chamber 22 into the main bale chamber 26.

Figure 4:
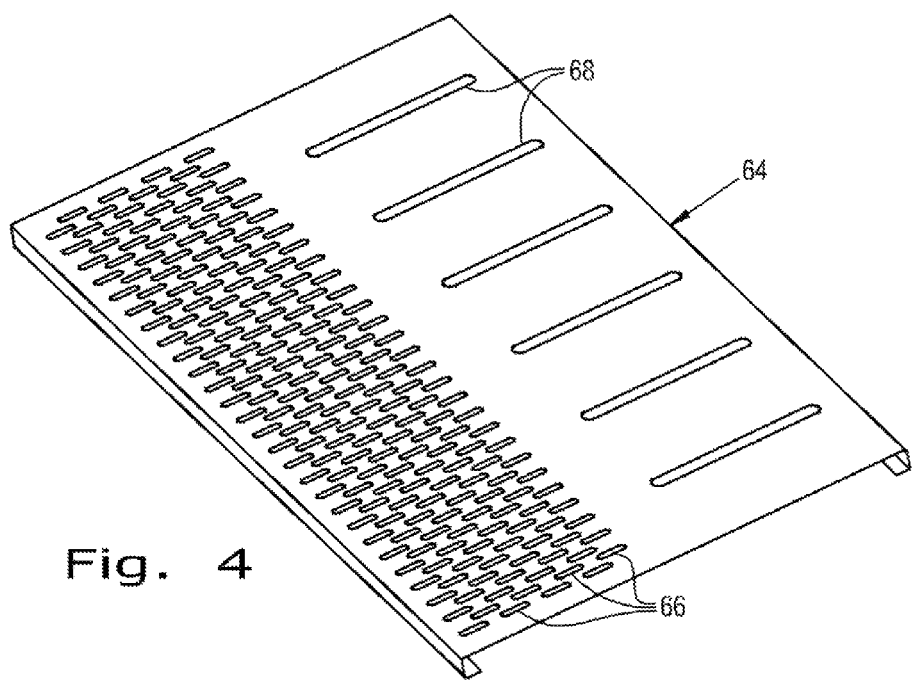
FIG. 4 is a perspective view of another embodiment of a sieve of the present invention which may be used in an agricultural baler.

FIGS. 4-13 illustrate various alternative embodiments of sieves which may replace any of the bottom wall section 50A-D shown in FIGS. 2 and 3. In FIG. 4, bottom wall section 64 includes short slots 66 and downstream long slots 68. Short slots 66 are arranged in an array of rows and columns of slots 66, and long slots 68 are arranged in a single transverse row of slots 68. Short slots 66 each have a longitudinal axis extending in the fore-to-aft direction. Long slots 68 are configured to receive the vertical plates 60 (i.e., sensor actuators) therein for actuation of the stuffer unit 24.

Figure 5:
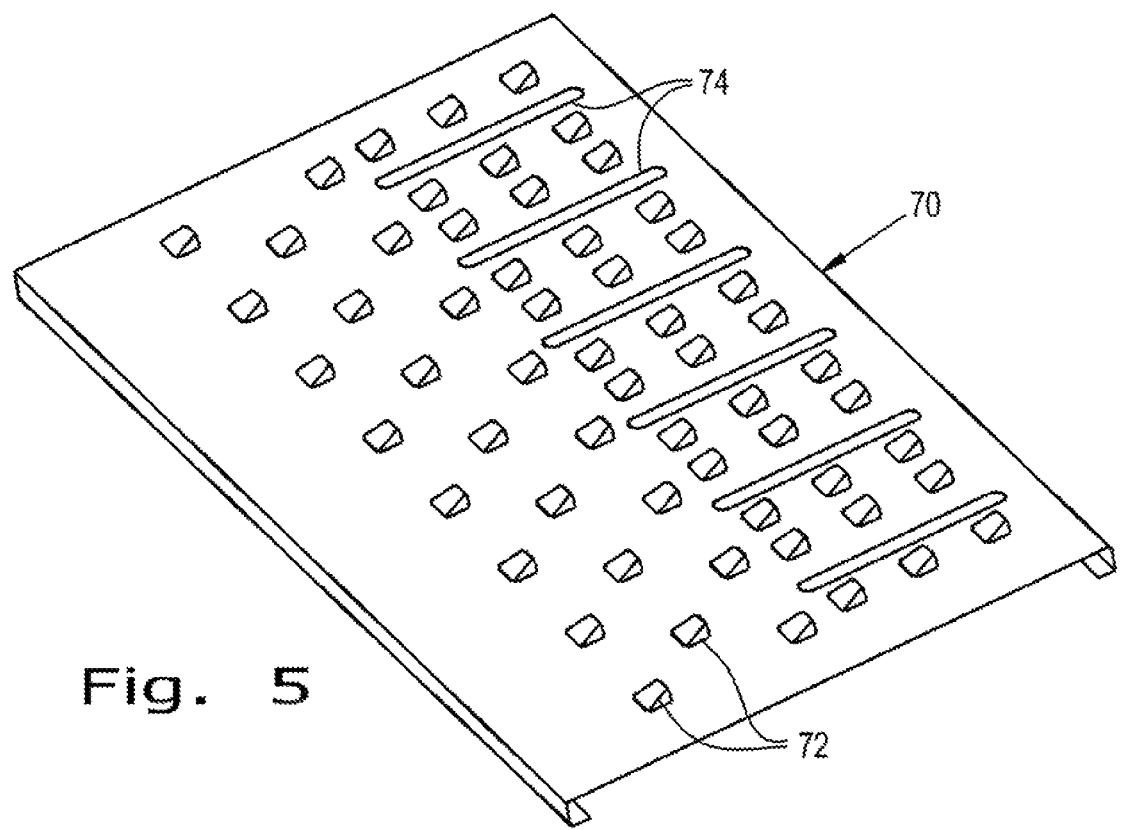
FIG. 5 is a perspective view of another embodiment of a sieve of the present invention which may be used in an agricultural baler.
Figure 6:
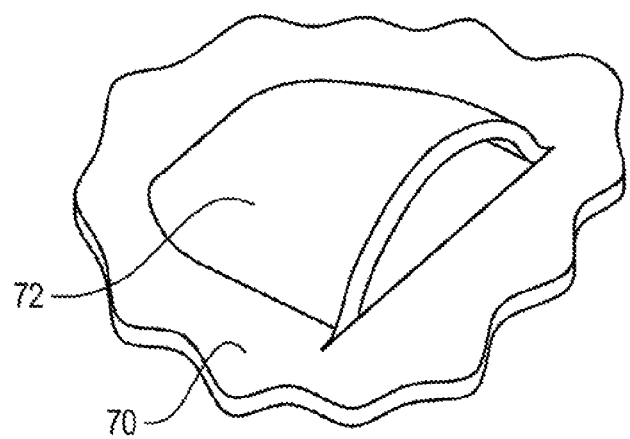
FIG. 6 is a detailed perspective view of one of the ramped apertures shown on the sieve of FIG. 5.

In FIGS. 5 and 6, bottom wall section 70 includes ramped apertures 72 and downstream long slots 74. Ramped apertures 72 are formed by a stamping or punching operation, and have an arcuate shaped opening extending above the upper surface of bottom wall section 70 (see FIG. 6). Long slots 74 are configured to receive the vertical plates 60 (i.e., sensor actuators) therein for actuation of the stuffer unit 24.

Figure 7:
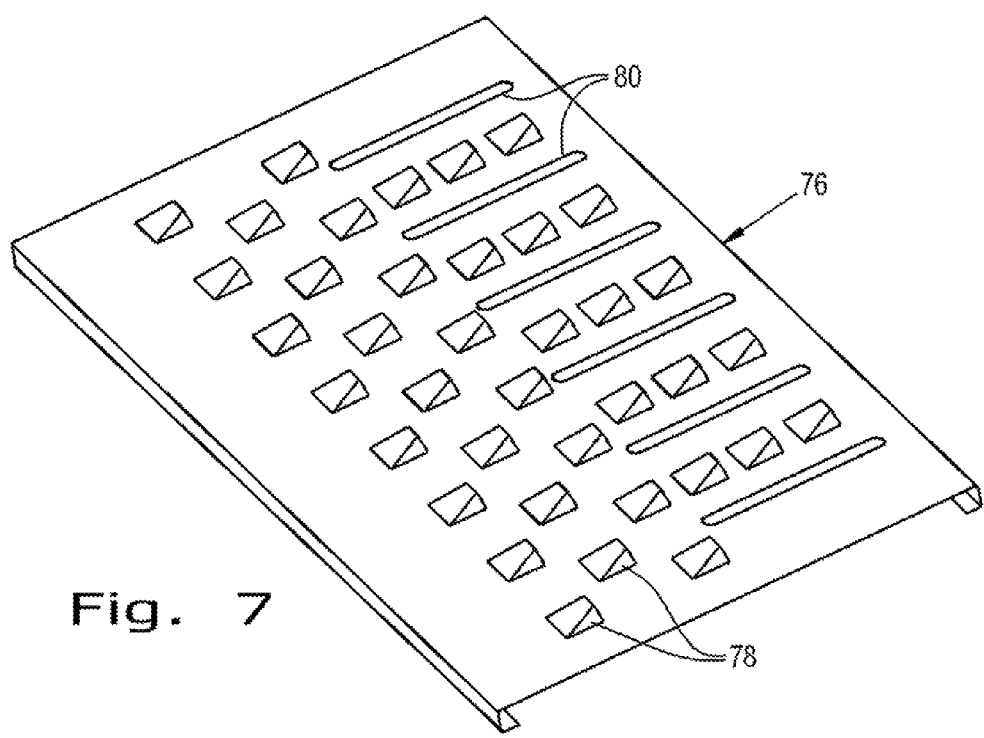
FIG. 7 is a perspective view of another embodiment of a sieve of the present invention which may be used in an agricultural baler.
Figure 8:
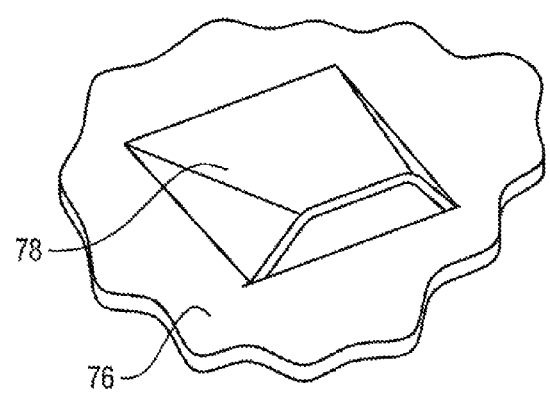
FIG. 8 is a detailed perspective view of one of the ramped apertures shown on the sieve of FIG. 7.

In FIGS. 7 and 8, bottom wall section 76 includes ramped apertures 78 and downstream long slots 80. Ramped apertures 78 are formed by a stamping or punching operation, and have a frustroconical shaped opening extending above the upper surface of bottom wall section 76 (see FIG. 8). Long slots 80 are configured to receive the vertical plates 60 (i.e., sensor actuators) therein for actuation of the stuffer unit 24.

Figure 9:
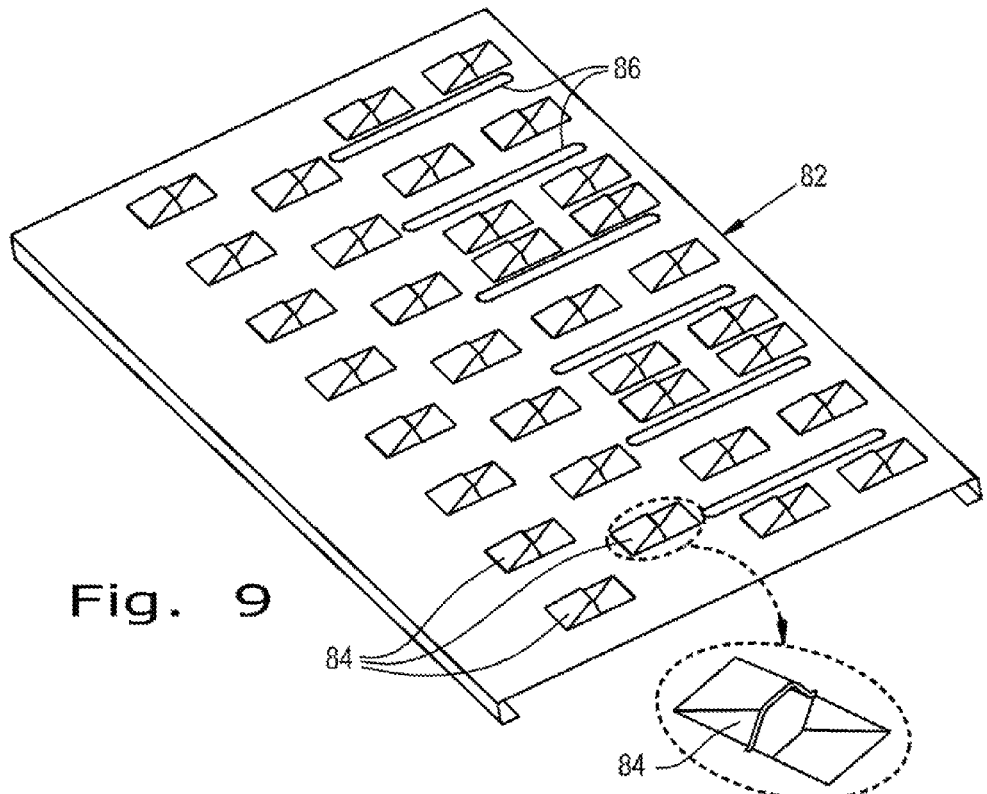
FIG. 9 is a perspective view of another embodiment of a sieve of the present invention which may be used in an agricultural baler.

In FIG. 9, bottom wall section 82 includes ramped apertures 84 and downstream long slots 86. Ramped apertures 84 are shaped similar to the ramped apertures 78 shown in FIGS. 7 and 8. However, the height of the ramped apertures 84 is about half the height of the ramped apertures 78, and a first part of the ramped apertures is located above the surface of the bottom wall section, while a second part is located under the surface of the bottom wall section. The overall layout or pattern of ramped apertures 84 may differ from the layout shown in FIG. 7. Long slots 86 are configured to receive the vertical plates 60 (i.e., sensor actuators) therein for actuation of the stuffer unit 24.

Figure 10:
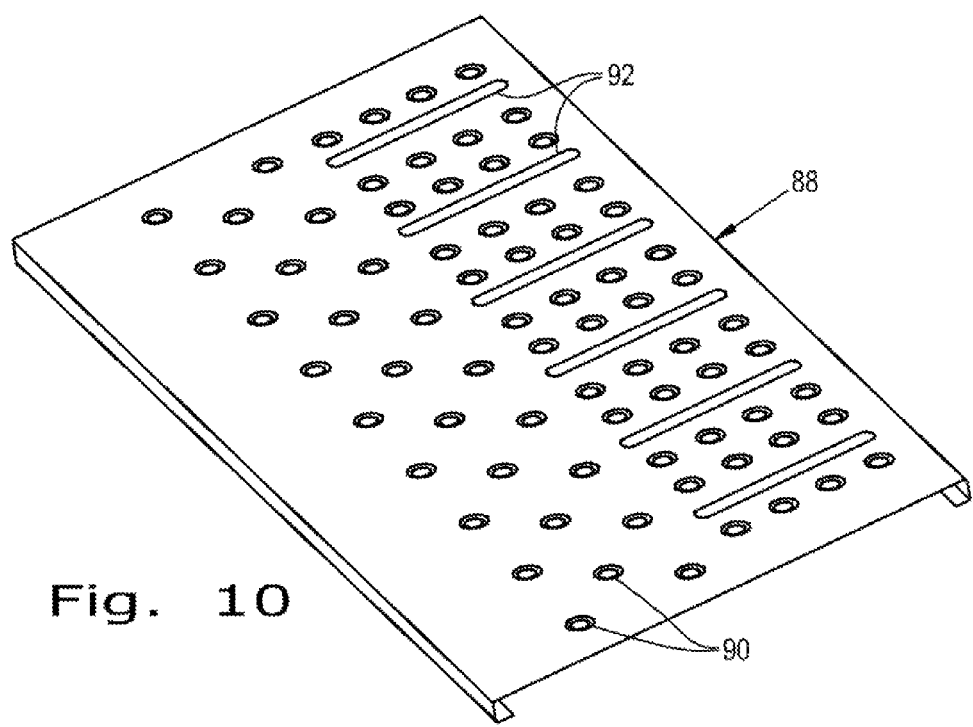
FIG. 10 is a perspective view of another embodiment of a sieve of the present invention which may be used in an agricultural baler.
Figure 11:
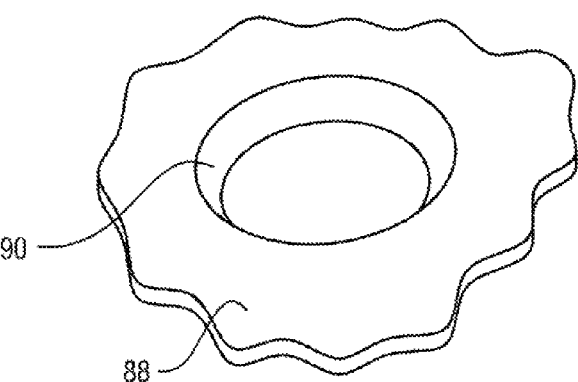
FIG. 11 is a detailed perspective view of one of the holes shown on the sieve of FIG. 10.

In FIGS. 10 and 11, bottom wall section 88 includes holes 90 and downstream long slots 92. Holes 90 are formed by a stamping or punching operation, and have a downwardly extending radius of curvature (see FIG. 11). Holes 90 have a sparser array configuration upstream from long slots 92, and a denser array configuration between long slots 92. Long slots 92 are configured to receive the vertical plates 60 (i.e., sensor actuators) therein for actuation of the stuffer unit 24.

Figure 12:
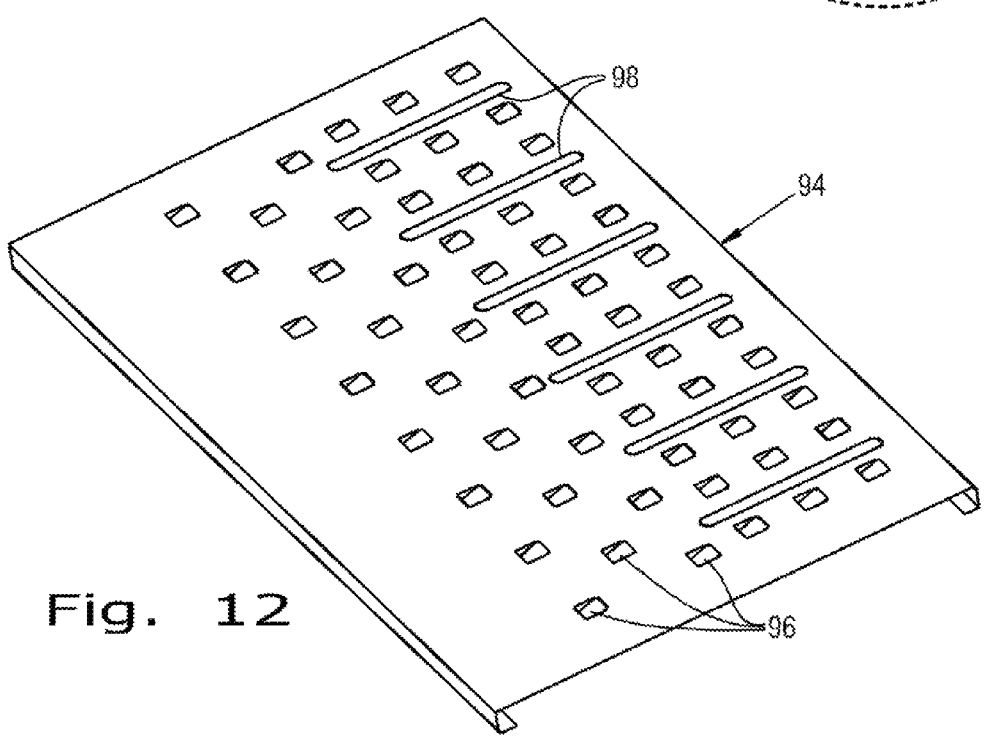
FIG. 12 is a perspective view of another embodiment of a sieve of the present invention which may be used in an agricultural baler.

FIG. 12 is very similar to the embodiment shown in FIGS. 5 and 6, and includes bottom wall section 94 with ramped apertures 96 and downstream long slots 98. Ramped apertures 96 are formed by a stamping or punching operation, and have an overall layout similar to the layout shown in FIG. 5. However, ramped apertures 96 extend in a downward direction from bottom wall section 94 rather than an upward direction. Long slots 98 are configured to receive the vertical plates 60 (i.e., sensor actuators) therein for actuation of the stuffer unit 24.

Figure 13:
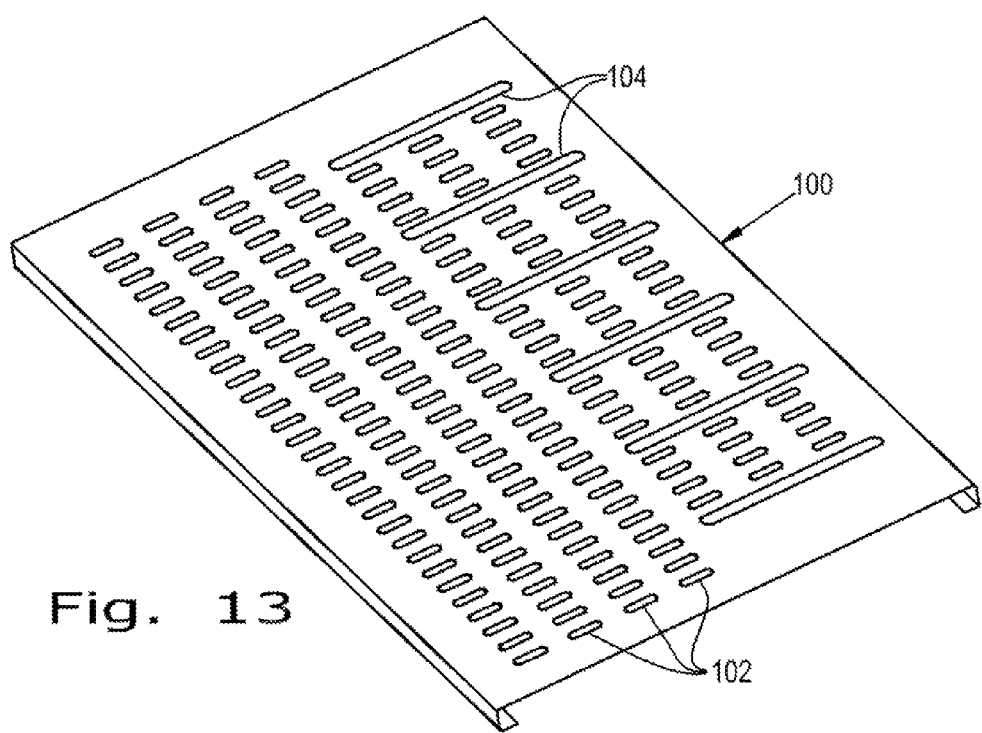
FIG. 13 is a perspective view of another embodiment of a sieve of the present invention which may be used in an agricultural baler.
Figure 14:
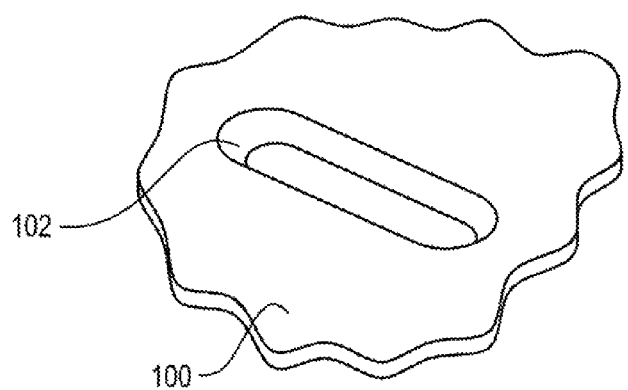
FIG. 14 is a detailed perspective view of one of the short slots shown on the sieve of FIG. 13.

In FIGS. 13 and 14, bottom wall section 100 includes short slots 102 and downstream long slots 104. Short slots 102 are formed by a stamping or punching operation, and have a downwardly extending radius of curvature (see FIG. 14). Short slots 102 have a tighter pattern density and continuous repeat pattern, when compared with some of the other embodiments illustrated in the drawings. Long slots 104 are configured to receive the vertical plates 60 (i.e., sensor actuators) therein for actuation of the stuffer unit 24.

Figure 15:
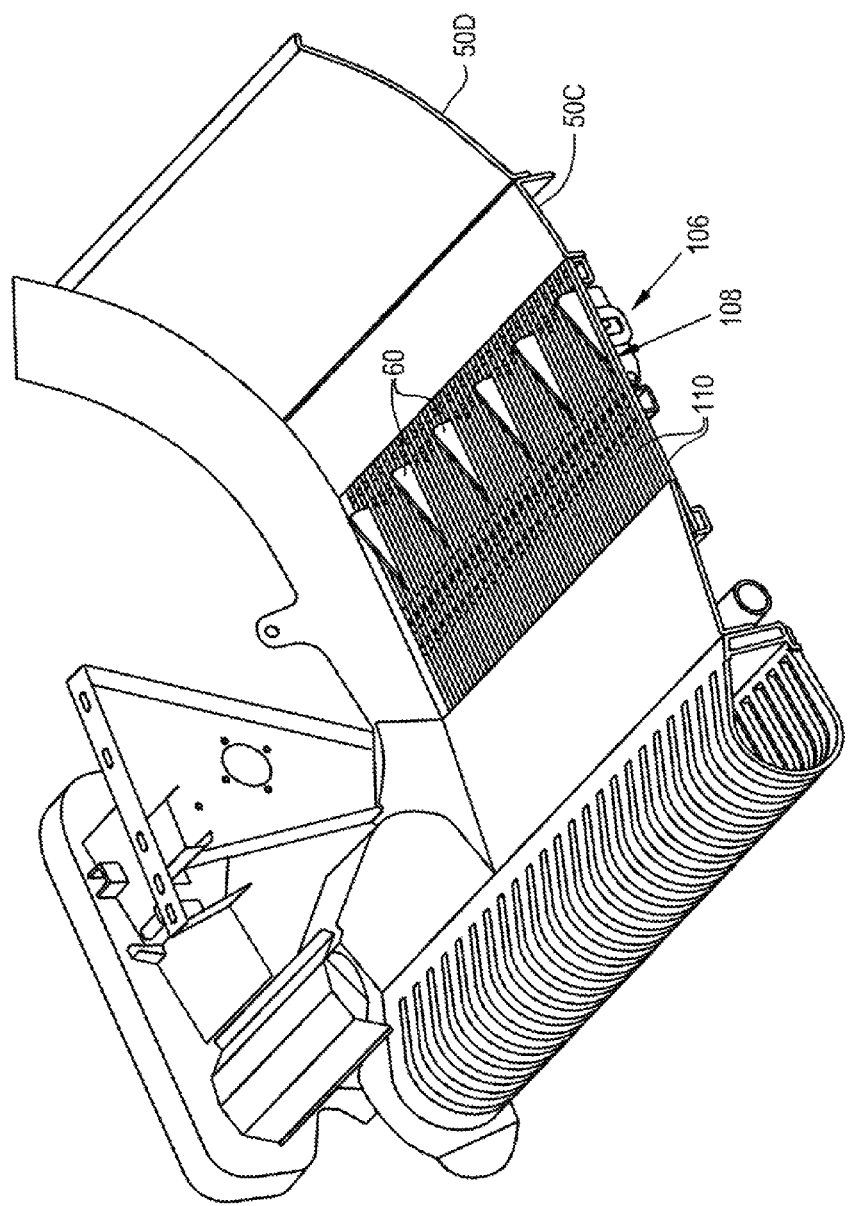
FIG. 15 is a perspective cutaway view showing a portion of a pickup unit and pre-compression chamber in a baler, showing another embodiment of a sieve of the present invention.
Figure 16:
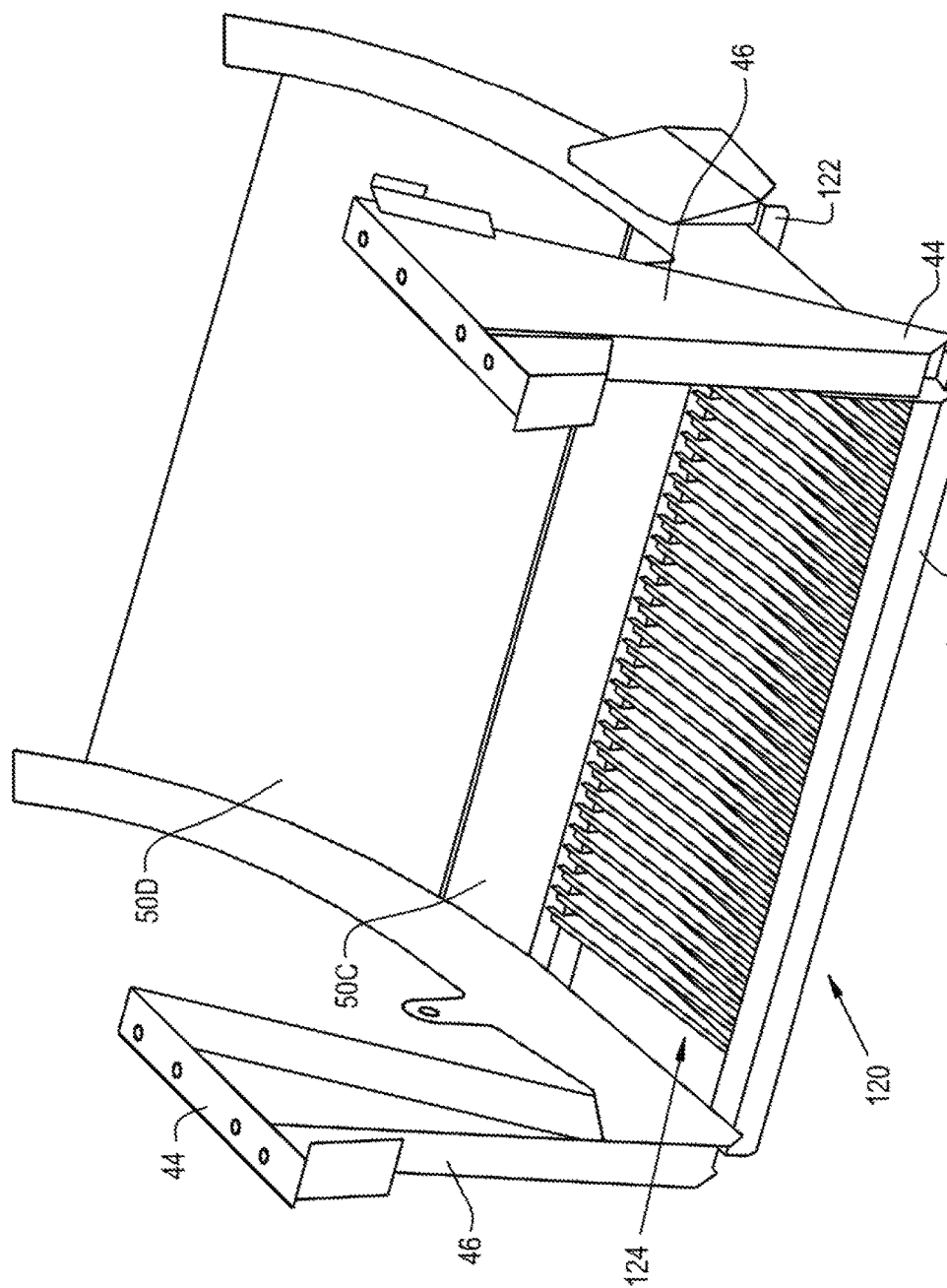
FIG. 16 is a perspective cutaway view showing a portion of a pre-compression chamber in a baler, showing another embodiment of a sieve of the present invention.

Referring now to FIG. 15, there is shown another embodiment of a sieve 106 of the present invention. In this embodiment, the first bottom wall section 50A and second bottom wall section 50B shown in FIGS. 2 and 3 are replaced with a single bottom wall section 108 which is made from a plurality of spaced apart and parallel rods 110 defining long slots therebetween. The vertical plates 60 (i.e., sensor actuators) can be positioned between adjacent rods 110, as shown.

FIGS. 16-20 illustrate another embodiment of a sieve 120 of the present invention which is positioned at the leading edge of a pre-compression chamber 22. Sieve 120 generally includes a pair of end rails 122 and a plurality of slats 124. Some of the slats are fixed slats 124A which are immovably attached to the end rails 122, and the remaining slats are swivel slats 124B which are movably attached to the end rails 122.

Figure 17:
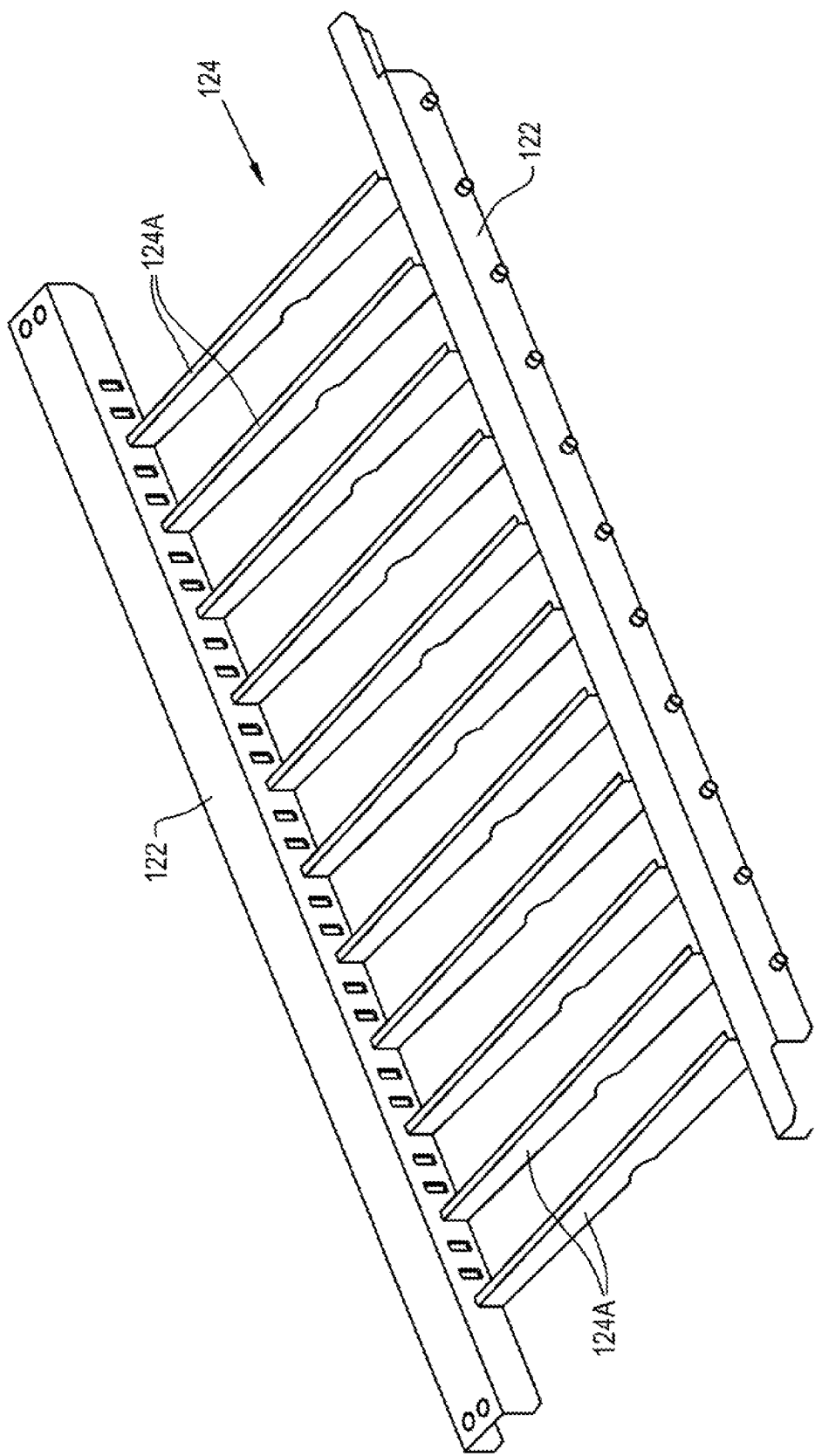
FIG. 17 is a perspective view of the sieve shown in FIG. 17, showing the fixed slats mounted to the end rails.
Figure 18:
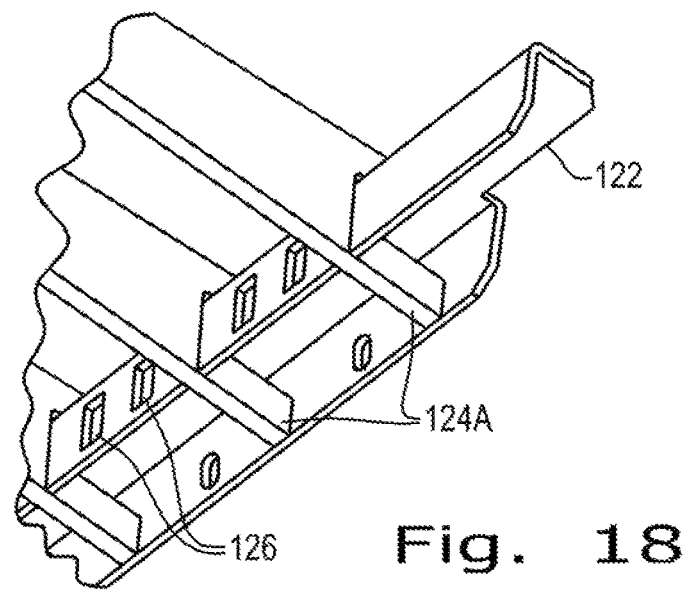
FIG. 18 is a detailed perspective view of the sieve shown in FIGS. 17 and 18, with a different view showing the fixed slats mounted to the end rails.
Figure 19:
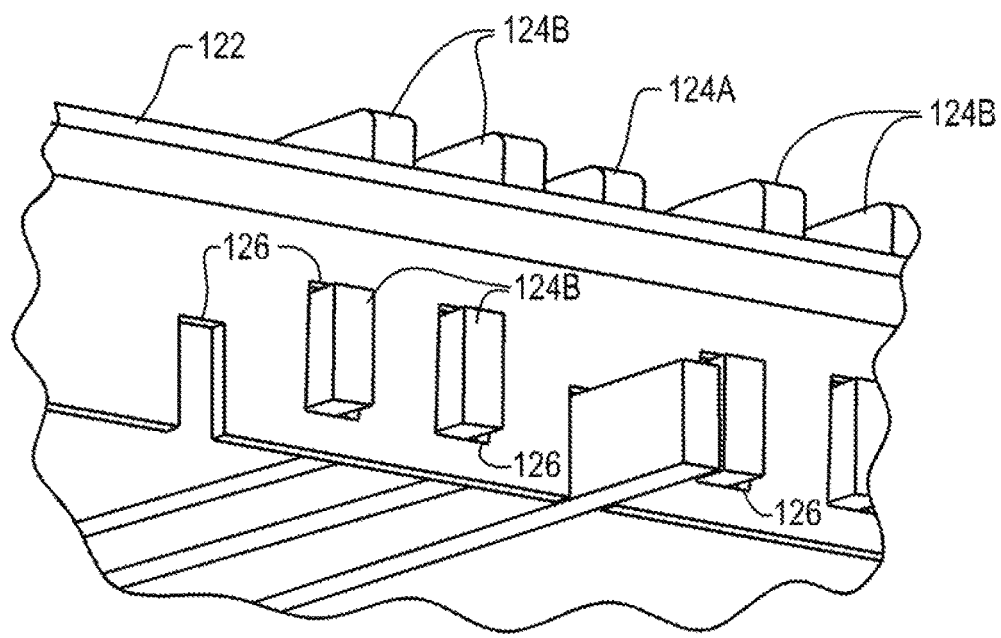
FIG. 19 is a detailed perspective view of the sieve shown in FIGS. 17-19, showing the mounting of both the fixed slats and swivel slats to one of the end rails.
Figure 20:
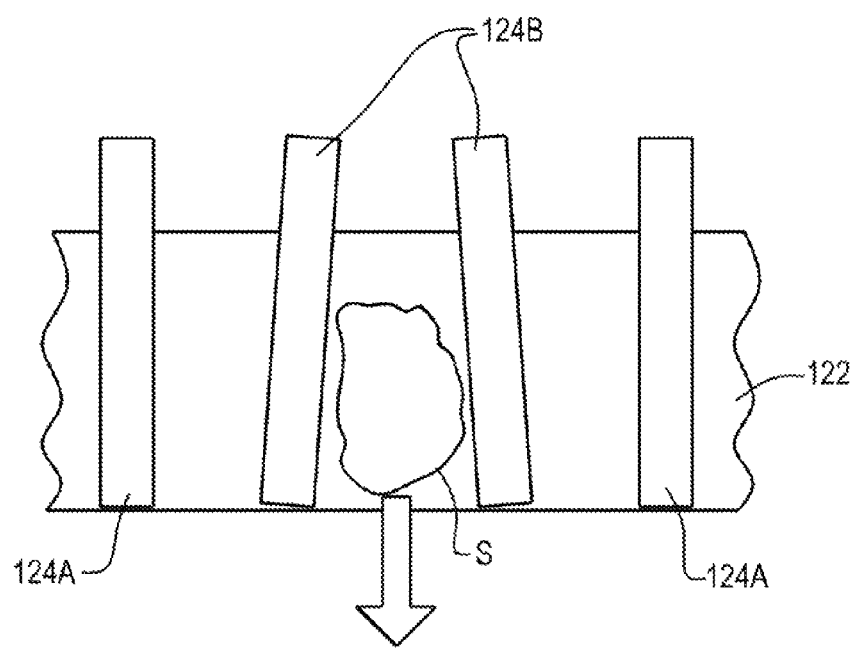
FIG. 20 is a sectional schematic view illustrating a stone passing through adjacent swivel slats.

More particularly, the fixed slats are 124A are attached in any suitable manner to the end rails 122, such as by welding, bolting, etc. The swivel slats 124B are installed in oversized holes 126 in each of the end rails 122 allowing movement of the movable slats 124B. Swivel slats 124B are allowed to move or swivel during operation, such that larger non-crop material such as stones can pass through to the ambient environment. FIGS. 17 and 18 are top and bottom perspective views illustrating the fixed slats 124A in place between the end rails 122. FIG. 19 is another perspective view illustrating the swivel slats 124B in place between the end rails 122. Each swivel slat 124B is positioned within an oversized hole 126 in end rails 122. In the illustrated embodiment, holes 126 are oversized rectangular shaped holes corresponding to the rectangular cross sectional profile at each end of swivel slats 124B. However, tapered shaped holes can also be used to allow for movement of the swivel slats 124B. In the case of a tapered hole, the top side of the hole will be smaller than the bottom side of the hole, to allow a bigger movement of the slats at the bottom side compared to the top. That way, stones will not be able to be trapped in between the swivel slats because more space is available due to the larger movement of the swivel slats. Other ways of allowing movement of swivel slats 124B may also be possible. During a harvesting operation, stones "S" and other similar shaped non-crop material are allowed to pass between swivel slats 124B as they swivel within the oversized holes 126 in end rails 122 (see FIG. 20). If a stone S is entering between a swivel slat 124B and a fixed slat 124A, only the swivel slat 124B will be able to move and to provide for the necessary space to allow the stone S to drop out.

Figure 21:
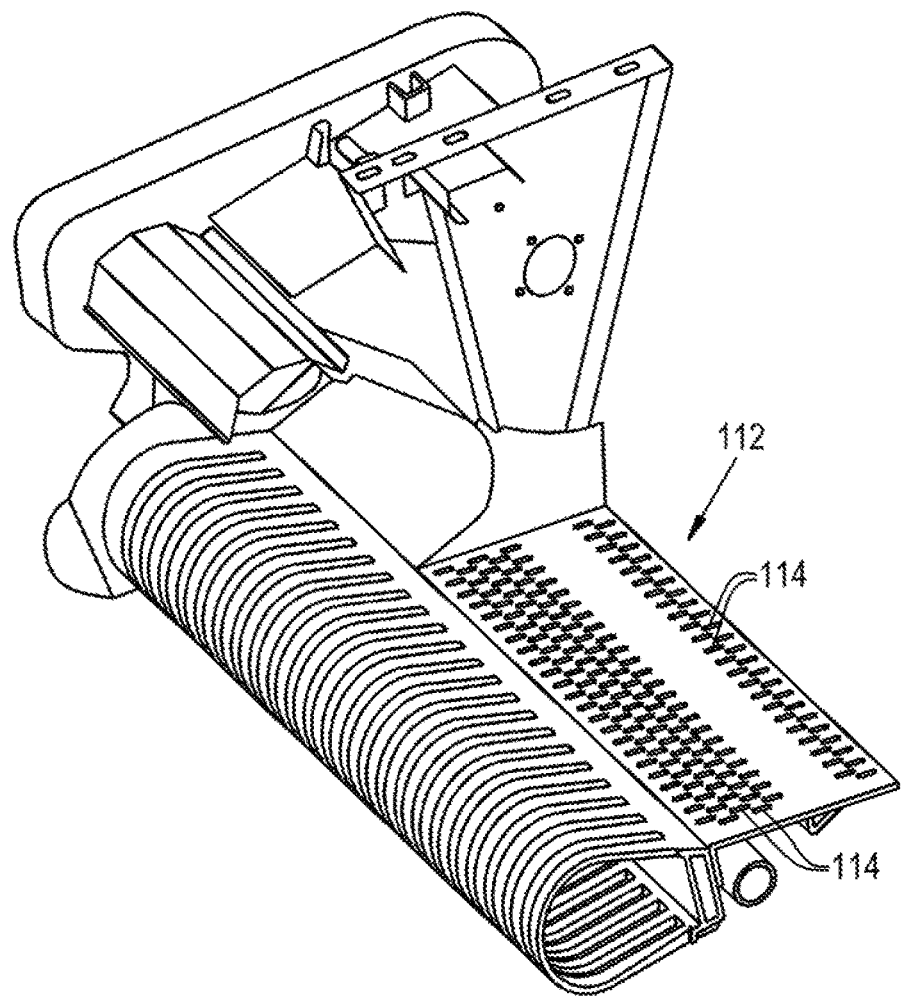
FIG. 21 is a perspective cutaway view showing a portion of a pickup unit and pre-compression chamber in a baler, showing another embodiment of a sieve of the present invention.

Referring now to FIG. 21, there is shown another embodiment of a sieve 112 of the present invention. In this embodiment, the bottom wall 48 of packer unit 18 defines a pick-up plate with the sieve 112, rather than being a part of the pre-compression chamber 22. Sieve 112 includes a plurality of slots 114 with a longitudinal axis extending in the fore-to-aft direction. Several transverse rows of slots 114 are located at the leading edge of the pick-up plate 48, and additional transverse rows of slots 114 are located at the trailing edge of the pick-up plate 48, with an area in between having no slots.

In the illustrated embodiments, various types of sieves are shown. However, it is also to be understood that multiple sieves may be used and/or sieves with different types of patterns may be used.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A processing conveyance for use between a pickup roll and a main bale chamber for conveying crop material from the pickup roll to the main bale chamber, said processing conveyance comprising:
   side walls, wherein at least of one said side walls includes a first sieve; and
   a bottom wall having at least one second sieve with at least one opening extending therethrough, each said opening being sized and configured for allowing non-crop material to exit from said at least one processing conveyance through said openings.

2. The processing conveyance of claim 1, further comprising a packer unit, said packer unit including a pickup plate defining said bottom wall with said at least one second sieve.

3. The processing conveyance of claim 1, wherein said openings include at least one of slots, holes and ramped apertures.

4. The processing conveyance of claim 3, wherein said openings include slots having a longitudinal axis extending in a generally fore-to-aft direction.

5. The processing conveyance of claim 1, wherein said openings include a plurality of holes.

6. The processing conveyance of claim 5, wherein said plurality of holes define a plurality of rows of holes.

7. The processing conveyance of claim 6, wherein said rows of holes are aligned in a generally fore-to-aft direction.

8. The processing conveyance of claim 1, wherein said at least one second sieve includes a frame with a pair of end rails and a plurality of slats attached to said end rails.

9. The processing conveyance of claim 8, wherein a portion of said slats are fixed slats which are immovably attached to said end rails, and a remaining portion of said slats are swivel slats which are movably attached to said end rails.

10. The processing conveyance of claim 9, wherein said swivel slats are installed in oversized holes in each of said end rails allowing movement of said movable slats.

11. The processing conveyance of claim 10, wherein said oversized holes are rectangular shaped holes.

12. The processing conveyance of claim 1, wherein the bottom wall includes a plurality of wall sections, and where at least one wall section has said at least one second sieve with at least one opening extending therethrough.

13. The processing conveyance of claim 1, wherein the bottom wall includes a plurality of wall sections, and at least two of said wall sections have a space therebetween defining one of said openings.

14. The processing conveyance of claim 1, wherein the non-crop material includes at least one of dust, dirt and stones.

15. The processing conveyance of claim 1, wherein said at least one processing conveyance includes a pre-compression chamber, said pre-compression chamber including said bottom wall with said at least one second sieve.

16. An agricultural harvester, comprising:
   a pickup unit including a pickup roll;
   a main bale chamber; and
   at least one conveyance positioned between said pickup roll and said main bale chamber for conveying crop material from said pickup roll to said main bale chamber, said at least one conveyance comprising a bottom wall, said bottom wall having at least one first sieve with at least one opening extending therethrough, each said opening being sized and configured for allowing non-crop material to exit from said at least one conveyance through said openings, wherein said at least one conveyance further comprises side walls and at least one of said side walls includes a second sieve.

17. The agricultural harvester of claim 16, wherein said at least one conveyance further comprises a pre-compression chamber, said pre-compression chamber including said bottom wall with said at least one first sieve.

18. The agricultural harvester of claim 16, wherein said at least one conveyance further comprises a packer unit, said packer unit including a pickup plate defining said bottom wall with said at least one first sieve.

19. The agricultural harvester of claim 16, wherein said openings include at least one of slots, holes and ramped apertures.

20. The agricultural harvester of claim 16, wherein said at least one first sieve includes a frame with a pair of end rails and a plurality of slats attached to said end rails.

21. The agricultural harvester of claim 20, wherein a portion of said slats are fixed slats which are immovably attached to said end rails, and a remaining portion of said slats are swivel slats which are movably attached to said end rails.

22. The agricultural harvester of claim 21, wherein said swivel slats are installed in oversized holes in each of said end rails allowing movement of said movable slats.

\* \* \* \* \*